United States Statutory Invention Registration [19]

[11] Reg. Number: H99

Jones et al. [45] Published: Aug. 5, 1986

[54] MODULAR UNSTABLE RING RESONATOR WITH MULTIPLE OUTPUT COUPLERS

[75] Inventors: Robert W. Jones; Charles M. Cason, III; James F. Perkins, all of Huntsville, Ala.

[73] Assignee: The United States of America as represented by the Secretary of the Army, Washington, D.C.

[21] Appl. No.: 613,481

[22] Filed: May 24, 1984

[51] Int. Cl.[4] ..... H01S 3/08; H01S 3/081

[52] U.S. Cl. ..... 372/108; 372/93; 372/95

[58] Field of Search ..... 372/94, 95, 108, 93

[56] References Cited

U.S. PATENT DOCUMENTS

| | | | |
|---|---|---|---|
| 3,772,609 | 11/1973 | Willett et al. | 372/23 |
| 4,011,523 | 3/1977 | Mansell et al. | 372/95 |
| 4,021,845 | 5/1977 | Wang | 372/23 |
| 4,190,814 | 2/1980 | Von Workum | 372/95 |

FOREIGN PATENT DOCUMENTS

| | | | |
|---|---|---|---|
| 0001138 | 1/1980 | Japan | 372/23 |
| 0024472 | 2/1980 | Japan | 372/23 |

OTHER PUBLICATIONS

Bykov et al. "$CO_2$ Laser Generating Simultaneously Two Wavelengths and Having High Amplitude & Freq. Stability", Prebory i Teckhncka E'ksperumenta, No. 6, pp. 161–162, Nov.–Dec. 1974.

Buholz; "Selected Five-color Operation of a $CO_2$ laser"; Optical Eng.; Mar./Apr. 1981, vol. 20, No. 2.

Harney; "Active Laser Resonator Control Techniques"; Appl. Optics vol. 17, No. 11, Jun. 1, 1978, p. 1671.

*Primary Examiner*—Stephen C. Buczinski
*Assistant Examiner*—Linda J. Wallace
*Attorney, Agent, or Firm*—Freddie M. Bush; John C. Garvin; Anthony T. Lane

[57] ABSTRACT

A modular unstable ring resonator utilizing several independent gain modules is used to obtain output of a multiple set of mutually coherent beams. Additionally, rigorous mutual coherence is maintained even when the system operates on more than one longitudinal mode or/and on more than one gain transition; specific frequency-control elements are eliminated; satisfactory operation is possible with one or more gain-medium modules disabled. Each segment of the ring resonator's optical path may contain a laser gain medium, an output mirror, and a beam expander for continuously circulating a portion of the system flux while also coupling out a portion of the flux from each output mirror. The plural outputs may be used individually or collectively.

9 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MODULAR UNSTABLE RING RESONATOR WITH MULTIPLE OUTPUT COUPLERS

DEDICATORY CLAUSE

The invention described herein may be manufactured, used, and licensed by or for the Government for governmental purposes without the payment to us of any royalties thereon.

BACKGROUND OF THE INVENTION

High power lasers with mutually coherent multiple output beams allow generation of larger total optical power levels than are possible with single-output-beam devices because of limitations such as optical power loading of mirrors and attenuation in the gain medium. Mutually coherent optical beams offer extremely high directionality of pointing by controlled coherent combination of several beams, similar to phased array usage of multiple antennas or horns in radio frequency or microwave devices. It is desirable to have output beams which are collimated and phase related, since otherwise separate optical systems for achieving these goals are likely to be required.

Optical power is lost in standing wave resonators when the gain medium is too long. The optical power is removed at the end. The gain is saturated therefore the optical power increases linearly with length, but the attenuation depletes the power in proportion to its intensity. Therefore there is a maximum length one can build efficient standing wave resonators. As the length is increased beyond the critical length, the optical power generated by the gain is exactly matched by that attenuated. This places a limit on the in phase maximum power that can be produced by a single aperture. If this limit is to be exceeded, then other methods must be found.

One method of overcoming this limit to obtain higher levels of total output flux can be achieved by simultaneous operation of independent oscillators, but this will not yield mutual coherence as needed for high directionality. Mutual coherence of multiple output beams can be achieved by using a beam splitter to obtain multiple output beams from a single flux generator (power oscillator) if total power output is low, however, flux loading of beamsplitters becomes intolerable for high flux levels. The combination of high flux and mutually coherent multiple beams can be achieved by frequency locking each of several individual power oscillators by injection into each of them of a low-power signal. The various low-power injection signals can be made to have the necessary mutual coherence by obtaining each of them by beam-splitting of a common reference signal. Unfortunately, this frequency locking method presents great practical difficulties. The laser system must be rigidly controlled to extremely tight specifications regarding such features as alignment of the input signal with the optic axis of each resonator and control of mirror separation for each of the resonators to match one another. These problems and other attendant difficulties are overcome by the subject resonator which automatically provides for multiple outputs from a single overall optical resonator path having all sections of gain path length less than the attenuation critical gain path length.

SUMMARY OF THE INVENTION

The modular unstable ring resonator comprises an arrangement of either exclusively reflective or primarily reflective optical elements and of laser gain medium modules. The resonator produces a multiplicity of separated output beams that are inherently and necessarily mutually coherent because the overall optical path which determines the specific operating frequency or frequencies is identically the same for all of the modules. The resonator readily produces output beams which are collimated, in essentially the same way that the output beam from a conventional single module confocal unstable resonator is collimated.

DESCRIPTION OF THE PREFERRED EMBODIMENT

Figure 1:
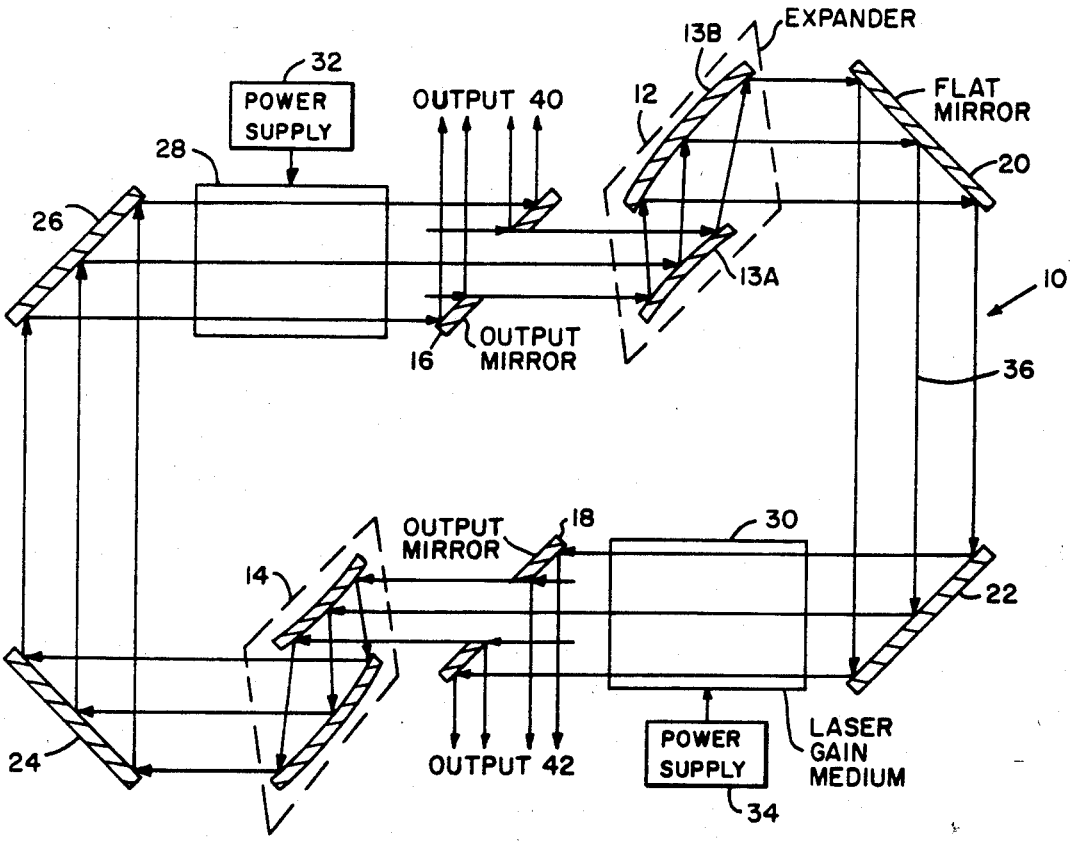
FIG. 1 is a preferred embodiment of a typical modular unstable ring resonator shown in schematic diagram.

Referring now to the drawings wherein like numbers refer to like parts, FIG. 1 discloses a schematic diagram of the modular unstable ring resonator. This embodiment sets forth two output beams from the resonator, however, a larger number of output beams and their pointing direction is readily attainable. As shown in FIG. 1, the modular unstable ring resonator 10 comprises two or more beam-expander modules (BEM) 12 and 14, beam output modules (BOM) 16 and 18, beam turning mirrors (BTM) 20, 22, 24 and 26, and two or more laser gain medium modules (LGMM) 28 and 30. The laser gain medium modules are shown generally coupled to respective power supplies 32 and 34 for supplying power to the respective laser gain medium systems, as is well known in the art. Power supplies 32 and 34 may be synchronized or may be a single source, where practical, to assure substantially simultaneous pumping of the laser gain mediums.

The BEM modules 12 and 14 are highly aplanatic, being very-low-aberration beam-expansion sections, for beams that are not required to be strongly folded and therefore do not require awkward geometric arrangements such as have been required in prior art practice. This aplanatic beam expansion enhances resonator operation. Each BEM modifies an impinging beam by expanding it in lateral extent while preserving high optical quality. The most common arrangement allows a collimated beam to emerge from each expander when a collimated beam is incident on it. The beam expanders are parallel types for which the emergent beam is parallel to the incident beam. Beam expanders of the anti-parallel type, in which the emergent beam is anti-parallel to the incident beam, can also be used. However all of the beam expanders in a given resonator should always be of one kind or the other, not mixed.

The beam output modules 16 and 18 are respective output mirrors having a central aperture therein. Each BOM extracts power from the circulating beam 36 and directs it into an output beam, (output 40 from mirror 16 and output 42 from mirror 18). One BOM is associated with each beam expander module. The preferred BOM configuration is a scraper mirror and associated support structure substantially as is used in a conventional standing-wave unstable resonator. An alternative BOM configuration is an arrangement whereby the portion of the beam which falls outside the geometric edges of the first mirror of a beam expander is utilized as an output beam. This type of arrangement is analogous to the corresponding type of beam output arrangement for a conventional standing-wave unstable resonator.

The beam turning mirrors are used to complete a closed optical loop. These mirrors will usually be flat. The resonator system provides a great deal of flexibility of arrangement of the overall optical path, which allows advantage to be taken of available space and packaging constraints that are relevant to a particular application. The overall optical path determined, for example, by the central ray of the optical beam which is circulating within the resonator can be approximately rectangular as shown by the path of beam 36 in FIG. 1. Obviously, numerous other shapes are feasible depending on the number of beam outputs to be obtained, the particular combination of these outputs, whether or not an output or outputs are to be folded, and other considerations.

Usually, at least one laser gain medium module (LGMM) is place within the input leg of each beam expander module. An input leg is defined as the portion of the optical path between the output of one BEM and the input to the next BEM. However, absence of, or temporary failure of, one or more laser gain medium module will not preclude operation of the overall laser resonator, even though relative amounts of output power from each module would be affected (reduced) by failure. Typically, where the resonator is to operate on a single line (providing a single output frequency), the gain medium may be $CO_2$—$N_2$—He. Where multiple lines are to lase (plural output frequencies), the gain medium may be a chemical or an excimer laser.

In operation of the system of FIG. 1, the laser gain mediums 28 and 30 are stimulated to emission, substantially simultaneously, and resonance is established in resonator 10 in the same way that conventional laser ring resonators initiate and are established. Beam expansion occurs in expanders 12 and 14 as the optical power circulates and is amplified in the gain medium. The output energy taken from the geometric couplers or mirrors 16 and 18, as shown, may be in a circular or square donut shape with the central portion of the energy being passed through the aperture of the mirror to be re-expanded and reamplified before reaching another output mirror. Positioning of the output modules 16 and 18 allow the output beam to be selectively directed for individual or collective (combined) use. As shown, the output beams 40 and 42 may be considered as used independently. However, these beams may be routinely redirected and brought together by established beam directing means. Alternatively and typically, the output beams may be directed internally within the plane of the resonator toward a central combining point or at an acute angle with the plane of the resonator may be directed toward a remote conical or pyramidal focal point for combining constructively.

Figure 2:
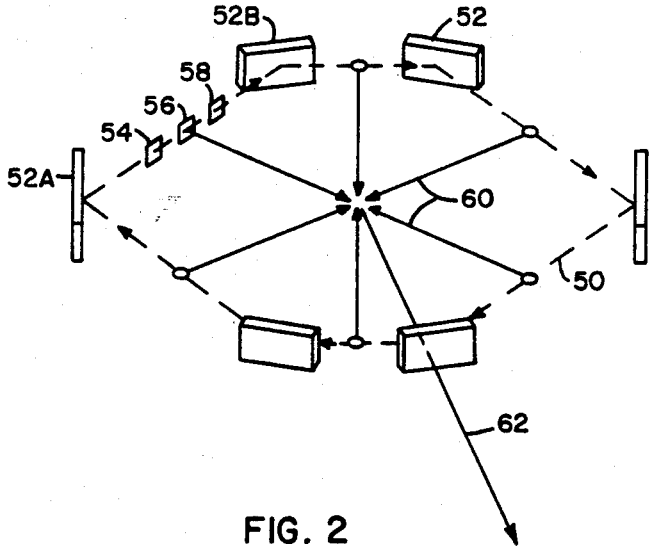
FIG. 2 is a single line drawing of a modular unstable ring resonator according to the invention and having a plurality of output beams having high directionality of pointing.

FIG. 2 shows a single line schematic of a modular unstable ring resonator providing a substantially hexagonal optical path 50 through the resonator. Six flat mirrors 52 are arranged at the turning points or corners of the hexagon for directing the beam from one leg to another. Each leg (as shown typically between mirrors 52A and 52B) contains a laser gain medium module 54, a beam output module 56, and a beam expander module 58. Output beams 60 from the respective legs project toward the central plane of the hexagon much as the spokes of a wheel project from the wheel rim to the hub of an axle. These beams are then redirected by beam turning mirrors (not shown) as a composite beam along axis 62. Since positioning of the beam output module (scraper mirror) controls the direction of the output beams, it is apparent that the general optical path of the resonator beam itself and the output beams may be described by numerous geometric shapes such as conical, rectangular, pyramidal, circular, etc.

The optical elements in any optical-resonator-controlled laser determine the operating frequency or frequencies and the transverse-mode properties. The optical elements of resonator 10 can be considered as a generalized form of ring resonator with two beam-expansion modules. Optical resonator 10 includes use of multiple expansion sections (12, 14, etc.) and multiple beam extractors (16, 18, etc.) which provide multiple power generation sections without the total generated power having to circulate within the system, and the incorporation of a common overall resonator optical path 36 length rigorously ensures identical frequency or frequencies of the output beams.

There is a special case of resonator 10 in which there is only one beam expander. This special case is somewhat similar to a conventional ring resonator. The configuration of the beam expander is, however, different from the conventional one in that it is a highly-off-axis aplanatic beam expander.

The general path configuration for the resonator in the form of a ring, as shown in FIGS. 1 and 2, is intended to be realistic as well as being schematic. Very low aberrations are accomplished by use of the highly off-axis expanders 12 and 14. These beam expander modules are shown as two-mirror (13A and 13B) modules and are designed to be rigorously aplanatic, i.e., to have rigorously vanishing onaxis coma as well as vanishing lower-order aberrations. There are two types of such aplanatic expanders, parallel and antiparallel. For parallel expanders, the emergent beam is parallel to the incident beam. For antiparallel expanders, the emergent beam is antiparallel to the incident beam. The expanders shown in FIG. 1 are of the parallel type.

The resonator has high total output power with relatively low optical loading of all output mirrors. It avoids the laser medium attenuative limit on standing wave resonators. Total output power for a given maximum flux on mirrors can be increased by a factor equal to the number of resonator modules. Mutually coherent output beams are automatically obtained by the resonator structure, thereby avoiding many difficulties of prior art methods of obtaining such multiple beams. Such difficulties include those associated with high flux loading of beamsplitting elements. These include the problem of removing heat deposited in the beam splitter by partial absorption of the beam power and problems associated with initially obtaining, and particularly of maintaining over substantial periods of operation, the necessary high optical quality of beam splitters.

Output beams from the modular unstable ring resonator are mutually coherent even when an operating frequency or frequencies change with time, providing only that the rate of change is slow compared to the round-trip transit time in the resonator (which is a weak restriction). For example, the outputs are mutually coherent even if more than one axial mode of the resonator is in operation, and/or there is laser output on more than one line of the gain medium.

Although the present invention has been described with reference to a preferred embodiment, workers skilled in the art will recognize that changes may be made in form and detail without departing from the spirit and scope of the foregoing disclosure. Accordingly, the scope of the invention should be limited only by the claims appended hereto.

We claim:

1. A modular unstable ring resonator consisting of: a plurality of beam turning mirrors, spaced apart and disposed for providing a circuitous optical path that forms the boundary of an area; a plurality of pairs of laser gain medium modules and beam expander modules, at least one pair of said plurality of pairs being disposed between adjacent ones of said beam turning mirrors in said optical path, and a plurality of beam output means for providing mutually coherent output beams, one of said beam output means being disposed between the laser gain medium module and beam expander module of each pair of said laser gain medium modules and beam expander modules.

2. A modular unstable ring resonator as set forth in claim 1 wherein said beam expander modules are inverted afocal telescopes and said beam output means are scraper mirrors.

3. A modular unstable ring resonator as set forth in claim 2 wherein said afocal telescopes are aplanatic.

4. A modular unstable ring resonator as set forth in claim 3 wherein said plurality of pairs of laser gain medium modules and beam expander modules comprise at least five pair, and said scraper mirrors are output mirrors having a central aperture therethrough for passing optical energy therethrough from said laser gain medium module to said beam expander module along said optical path.

5. A modular unstable ring resonator consisting of: a closed loop optical path; a plurality of beam turning mirrors selectively located for directing optical flux around said optical path; said optical path being defined as a plurality of path segments, each path segment lying between respective adjacent mirrors; a plurality of means disposed in said optical path for amplifying optical flux passing therethrough, and plural output mirrors disposed in respective parts of the optical path for output coupling separate, distinct, and mutually coherent beams of flux.

6. A modular unstable ring resonator as set forth in claim 5 wherein each of said means disposed in said optical path for amplifying optical flux comprises a laser gain medium having an optical input and output for said optical flux, and a beam expander in series therewith for expanding output flux received from said laser gain medium.

7. A modular unstable ring resonator as set forth in claim 6 wherein said output mirrors have a central aperture therethrough, and wherein one of said plural output mirrors is disposed between each laser gain medium output and the beam expander for providing respective flux outputs.

8. A modular unstable ring resonator as set forth in claim 7 wherein said plurality of path segments are first, second, third, and fourth sequential segments, said plurality of amplifying means are first and second amplifying means disposed in respective first and third of said path segments, and wherein said plural output mirrors are first and second mirrors disposed in said first and third path segments respectively.

9. A modular unstable ring resonator as set forth in claim 8 wherein said beam expanders are aplanatic and said output mirrors are disposed for directing output flux toward a common point for combining the outputs.

* * * * *